(12) United States Patent
Guo et al.

(10) Patent No.: US 10,651,951 B2
(45) Date of Patent: May 12, 2020

(54) METHODS AND APPARATUS FOR SUB-BLOCK BASED ARCHITECTURE OF CHOLESKY DECOMPOSITION AND CHANNEL WHITENING

(71) Applicant: Cavium, LLC, Santa Clara, CA (US)

(72) Inventors: Yuanbin Guo, Mountain House, CA (US); Hong Jik Kim, San Jose, CA (US)

(73) Assignee: Cavium, LLC., Santa Clara, CA (US)

( * ) Notice: Subject to any disclaimer, the term of this patent is extended or adjusted under 35 U.S.C. 154(b) by 0 days.

(21) Appl. No.: 16/236,455

(22) Filed: Dec. 29, 2018

(65) Prior Publication Data

US 2019/0342013 A1 Nov. 7, 2019

Related U.S. Application Data

(60) Provisional application No. 62/665,271, filed on May 1, 2018.

(51) Int. Cl.
*H04B 15/00* (2006.01)
(52) U.S. Cl.
CPC .................................. *H04B 15/00* (2013.01)
(58) Field of Classification Search
CPC ........ H04B 15/00; H04B 3/54; H04B 7/0413; H04B 7/10; H04L 25/03993;
(Continued)

(56) References Cited

U.S. PATENT DOCUMENTS 7,200,631 B2 * 4/2007 Mailaender ............. G06F 17/16
708/520
9,112,744 B1 * 8/2015 Venkatesh ......... H04L 25/03993
(Continued)

OTHER PUBLICATIONS

"3GPP Technical Specification 36.211", 2013, V10.7.0, Valbonne, France, www.3gpp.org.
(Continued)

*Primary Examiner* — Janice N Tieu
(74) *Attorney, Agent, or Firm* — JW Law Group; James M. Wu

(57) ABSTRACT

Methods and apparatus for sub-block based architecture of Cholesky decomposition and channel whitening. In an exemplary embodiment, an apparatus is provided that parallel processes sub-block matrices ($R_{00}$, $R_{10}$, and $R_{11}$) of a covariance matrix (R) to determine a whitening coefficient matrix (W). The apparatus includes a first LDL coefficient calculator that calculates a first whitening matrix $W_{00}$, lower triangle matrix $L_{00}$, and diagonal matrix $D_{00}$ from the sub-block matrix $R_{00}$, a first matrix calculator that calculates a lower triangle matrix $L_{10}$ from the sub-block matrix $R_{10}$ and the matrices $L_{00}$ and $D_{00}$, and a second matrix calculator that calculates a matrix X from the matrices $D_{00}$ and $L_{10}$. The apparatus also includes a matrix subtractor that calculates a matrix Z from the matrix X and the sub-block matrix $R_{11}$, a second LDL coefficient calculator that calculates a third whitening matrix $W_{11}$, lower triangle matrix $L_{11}$, and a diagonal matrix $D_{11}$ from the matrix Z, and a third matrix calculator that calculates a second whitening matrix $W_{10}$ from the matrices $L_{00}$, $L_{10}$, $L_{11}$, and $D_{11}$.

20 Claims, 7 Drawing Sheets

(58) Field of Classification Search
CPC . H04L 25/0258; H04L 25/0228; H04L 25/38; H04L 1/006; H04L 25/0202; H04L 25/0242; H04L 25/025; H04L 25/0256; H04L 25/03891; H04L 25/0391; H04L 2201/04; H04L 2201/06; H04L 25/0246; H04L 25/0204

See application file for complete search history.

(56) References Cited

U.S. PATENT DOCUMENTS

| | | | | |
|---|---|---|---|---|
| 2005/0101253 A1* | 5/2005 | Pajukoski | ............ | H04B 7/0857 455/63.1 |
| 2007/0072551 A1* | 3/2007 | Pajukoski | ............ | H04B 7/0857 455/63.1 |
| 2011/0268230 A1* | 11/2011 | Xu | ........................ | H04B 7/0413 375/340 |
| 2014/0140448 A1* | 5/2014 | Leach | ............... | H04L 25/03891 375/341 |
| 2018/0034532 A1* | 2/2018 | Wu | ........................ | H04B 7/0854 |

OTHER PUBLICATIONS

D. Wang, S. Yang, Y. Liao, Y. Liu, "Efficient Receiver Scheme for LTE PUCCH" in IEEE Communications Letter, Mar. 2012, vol. 16 No. 3.

Y. Wu, D. Danev, E. G. Larsson, "On ACK/NACK Messages Detection in the LTE PUCCH with Multiple Receive Antennas" in 20th European Signal Processing Conference, Aug. 27-31, 2012, Bucharest, Romania.

\* cited by examiner

10,651,951 B2

METHODS AND APPARATUS FOR SUB-BLOCK BASED ARCHITECTURE OF CHOLESKY DECOMPOSITION AND CHANNEL WHITENING

CLAIM TO PRIORITY

This application claims the benefit of priority from U.S. Provisional Application No. 62/665,271, filed on May 1, 2018, and entitled "METHOD AND APPARATUS FOR SUB-BLOCK BASED ARCHITECTURE OF CHOLESKY DECOMPOSITION AND CHANNEL WHITENING," which is incorporated by reference herein in its entirety.

FIELD

The exemplary embodiment(s) of the present invention relates to telecommunications network. More specifically, the exemplary embodiment(s) of the present invention relates to receiving and processing data stream via a wireless communication network.

BACKGROUND

With a rapidly growing trend of mobile and remote data access over a high-speed communication network such as third (3G), fourth (4G) or fifth (5G) generation cellular services, accurately delivering and deciphering data streams become increasingly challenging and difficult. The high-speed communication network which is capable of delivering information includes, but not limited to, wireless network, cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

In the Long-Term Evolution (LTE) or 5G standard, pre-whitening is applied in the receiver to whiten a correlated noise covariance matrix to be un-correlated to ease signal detection. Typically, the whitening is done by using a Cholesky Decomposition, such as a well-known LDL or LL decomposition procedure to generate whitening filters. However, the original LDL decomposition involves an iterative procedure depending on the dimension of the input matrix. Also, its sequential nature does not facilitate easy parallelization of the computation for efficient VLSI implementations, especially when the dimension of the input matrix grows.

Therefore, it is desirable to have a way to perform channel whitening that overcomes problems associated with iterative processes and that facilitate easy parallelization of the computation for efficient VLSI implementations, especially when the dimension of the input matrix grows.

SUMMARY

The following summary illustrates a simplified version(s) of one or more aspects of present invention. The purpose of this summary is to present some concepts in a simplified description as more detailed description that will be presented later.

In various exemplary embodiments, methods and apparatus are disclosed for a sub-block architecture for Cholesky decomposition to provide channel whitening. In various exemplary embodiments, a covariance matrix is broken into sub-blocks to facilitate the parallel calculation of whitening coefficients. A specialized 2×2 coefficient calculator is provided that receives a Hermitian matrix and calculates whitening coefficients. An apparatus is provided that utilizes the coefficient calculator to process multiple sub-blocks of the covariance matrix in parallel to calculate a complete whitening coefficient matrix. The apparatus including the specialized calculator perform channel whitening using a parallel process overcomes problems associated with iterative processes, and that facilitate efficient VLSI implementations, especially when the dimension of the input matrix grows.

In an exemplary embodiment, an apparatus is provided that parallel processes sub-block matrices ($R_{00}$, $R_{10}$, and $R_{11}$) of a covariance matrix (R) to determine a whitening coefficient matrix (W). The apparatus includes a first LDL coefficient calculator that calculates a first whitening matrix $W_{00}$, lower triangle matrix $L_{00}$, and diagonal matrix $D_{00}$ from the sub-block matrix $R_{00}$, a first matrix calculator that calculates a lower triangle matrix $L_{10}$ from the sub-block matrix $R_{10}$ and the matrices $L_{00}$ and $D_{00}$, and a second matrix calculator that calculates a matrix X from the matrices $D_{00}$ and $L_{10}$. The apparatus also includes a matrix subtractor that calculates a matrix Z from the matrix X and the sub-block matrix $R_{11}$, a second LDL coefficient calculator that calculates a third whitening matrix $W_{11}$, lower triangle matrix $L_{11}$, and a diagonal matrix $D_{11}$ from the matrix Z, and a third matrix calculator that calculates a second whitening matrix $W_{10}$ from the matrices $L_{00}$, $L_{10}$, $L_{11}$, and $D_{11}$.

In an exemplary embodiment, a method is disclosed for parallel processing sub-block matrices ($R_{00}$, $R_{10}$, and $R_{11}$) of a covariance matrix (R) to determine a whitening coefficient matrix (W). The method includes calculating a first whitening matrix $W_{00}$, lower triangle matrix $L_{00}$, and diagonal matrix $D_{00}$ from the sub-block matrix $R_{00}$, calculating a lower triangle matrix $L_{10}$ from the sub-block matrix $R_{10}$ and the matrices $L_{00}$ and $D_{00}$, and calculating a matrix X from the matrices $D_{00}$ and $L_{10}$. The method also includes calculating a matrix Z from the matrix X and the sub-block matrix $R_{11}$, calculating a third whitening matrix $W_{11}$, lower triangle matrix $L_{11}$, and a diagonal matrix $D_{11}$ from the matrix Z, and calculating a second whitening matrix $W_{10}$ from the matrices $L_{00}$, $L_{10}$, $L_{11}$, and $D_{11}$ Additional features and benefits of the exemplary embodiment(s) of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
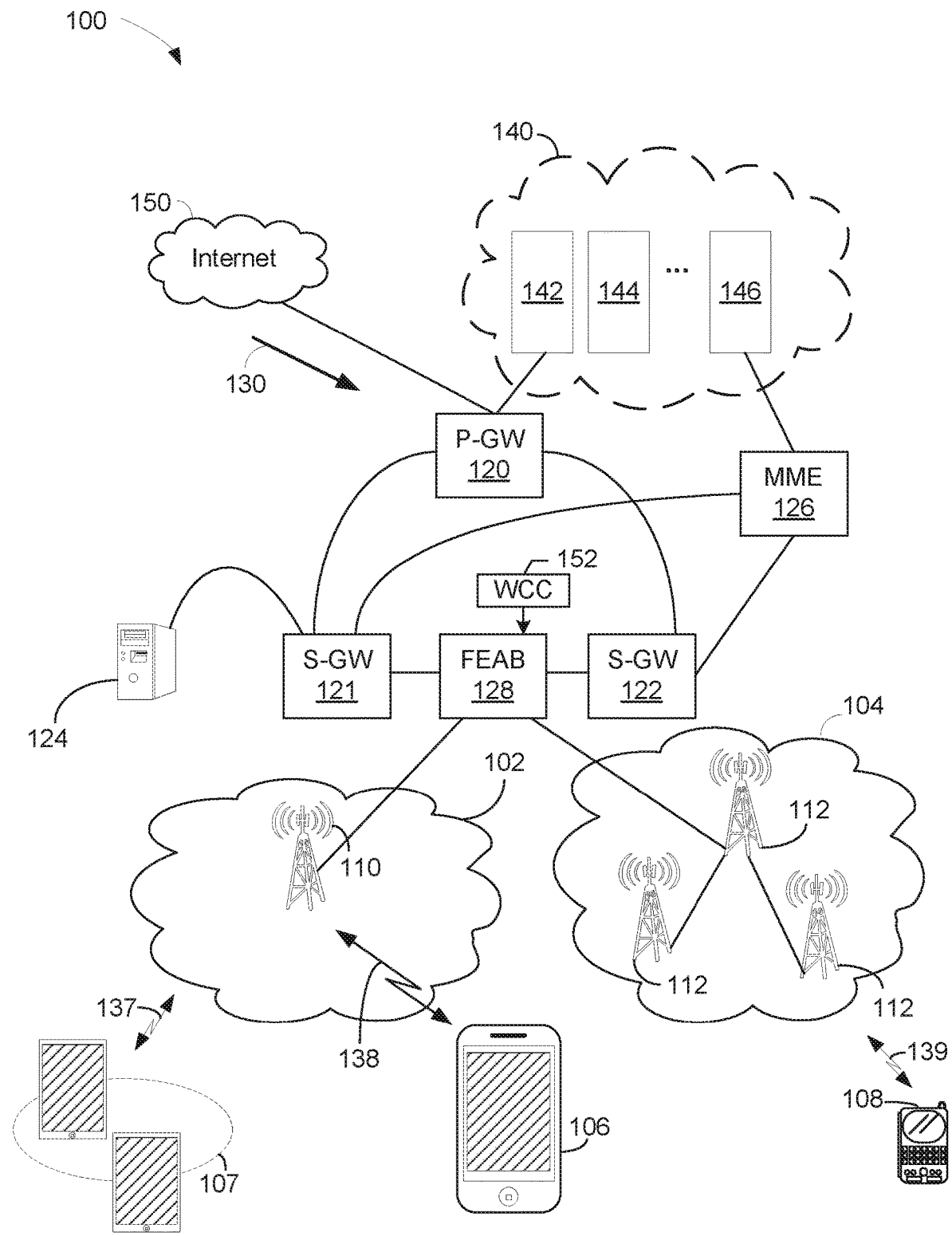
FIG. 1 is a block diagram illustrating a communication network configured to transmit and receive data streams using various embodiments of a whitening coefficient calculator to provide channel whitening.

Aspects of the present invention are described herein comprising methods and apparatus for a sub-block architecture for Cholesky decomposition to provide channel whitening.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 is a block diagram illustrating a communication network 100 configured to transmit and receive data streams using various embodiments of a sub-block architecture for Cholesky decomposition to provide channel whitening. The network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concept of the exemplary embodiment(s) of the present invention would not change if one or more blocks (or devices) were added to or removed from diagram 100.

The network configuration illustrated by the communication network 100 may also be referred to as a third generation ("3G"), 4G, LTE, 5G, or combination of 3G and 4G cellular network configuration. MME 126, in one aspect, is coupled to base stations (or cell site) and S-GWs capable of facilitating data transfer between 3G and LTE or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core network(s).

Sectors or blocks 102-104 are coupled to a base station or FEAB 128, which may also be known as cell site, node B, or eNodeB. Sectors 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

Server 124 is coupled to P-GW 120 and base stations 102-104 via S-GW 121 or 122. In one embodiment, server 124 which contains a soft decoding scheme 128 is able to distribute and/or manage soft decoding and/or hard decoding based on predefined user selections. In one exemplary instance, upon detecting a downstream push data 130 addressing to mobile device 106 which is located in a busy traffic area or noisy location, base station 102 can elect to decode the downstream using the soft decoding scheme distributed by server 124. One advantage of using the soft decoding scheme is that it provides more accurate data decoding, whereby overall data integrity may be enhanced.

When receiving bit-streams via one or more wireless or cellular channels, a decoder can optionally receive or decipher bit-streams with hard decision or soft decision. A hard decision is either 1 or 0 which means any analog value greater than 0.5 is a logic value one (1) and any analog value less than 0.5 is a logic value zero (0). Alternatively, a soft decision or soft information can provide a range of value from 0, 0.2, 0.4, 0.5, 0.6, 0.8, 0.9, and the like. For example, soft information of 0.8 would be deciphered as a highly likelihood one (1) whereas soft information of 0.4 would be interpreted as a weak zero (0) and maybe one (1).

A base station, in one aspect, includes one or more FEABs 128. For example, FEAB 128 can be a transceiver of a base station or eNodeB. In one aspect, mobile devices such tables or iPad® 107 uses a first type of RF signals to communicate with radio tower 110 at sector 102 and portable device 108 uses a second type of RF signals to communicate with radio tower 112 at sector 104. After receiving RF samples, FEAB 128 is able to process samples using a whitening coefficient calculator (WCC) 152 that generates whitening coefficients to implement a whitening filter. In an exemplary embodiment, the WCC 152 determines whitening coefficients using a sub-block Cholesky decomposition architecture that overcomes problems associated with iterative processes and facilitates easy parallelization of the computation for efficient VLSI implementations, especially when the dimension of the input matrix grows.

Figure 2:
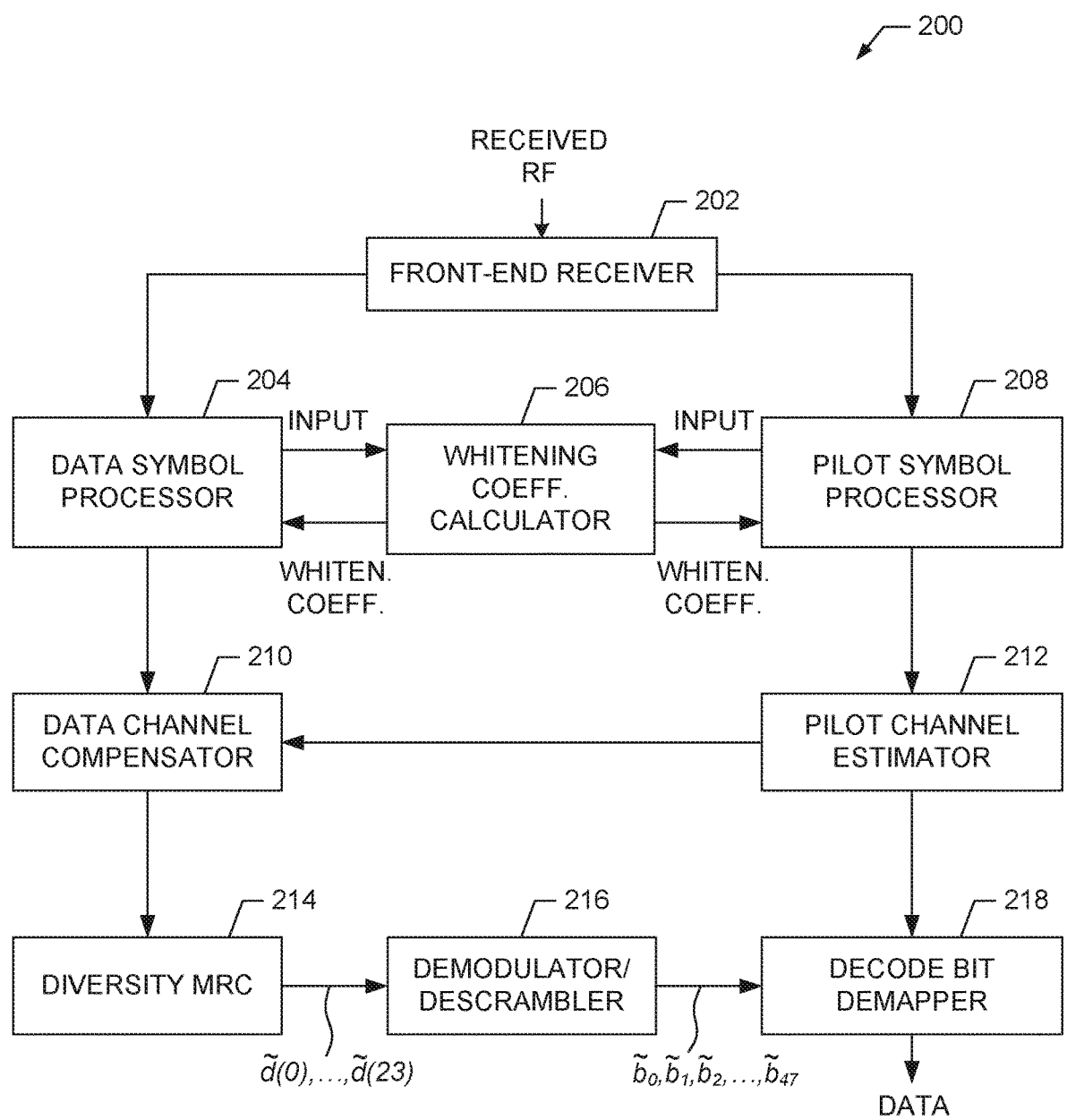
FIG. 2 is a block diagram illustrating an LTE/5G PUCCH receiver that includes an exemplary embodiment of a whitening coefficient calculator that generates whitening coefficients for channel whitening.

FIG. 2 is a block diagram illustrating an LTE/5G PUCCH receiver 200 that includes an exemplary embodiment of a whitening coefficient calculator 206 that generates whitening coefficients for channel whitening. For example, the receiver 200 is suitable for use in one or more of the communicating devices shown in FIG. 1.

The receiver 200 comprises a front-end receiver 202 that provides frequency domain processes to received RF signals and outputs data symbols to a data symbol processor 204 and pilot symbols to a pilot symbol processor 208. The data symbol processor 204 performs DFT functions that include data whitening. The pilot symbol processor 208 performs pilot AFC and pilot whitening. Both the data symbol processor 204 and the pilot symbol processor 208 provide inputs to the WCC 206 to obtain whitening coefficients that can be used to implement whitening filters. In various exemplary embodiments, the WCC 206 performs 2×2 sub-block Cholesky decomposition to generate whitening coefficients that are passed to the data symbol processor 204 and pilot symbol processor 208, which apply whitening filters to the data and pilot information.

The data symbol processor 204 and pilot symbol processor 208 output whitened data and pilot information to a data channel compensator 210 and a pilot channel estimator 212, respectively. The pilot channel estimator 212 output channel estimates to the data channel compensator 210. After the data channel compensator 210, the data flows to a diversity MRC 214, demodulator/descrambler 216, and decode bit demapper 218 that outputs data for further processing.

In various exemplary embodiments, the WCC 206 operates to divide a Cholesky decomposition into sub-blocks that allow the whitening coefficients to be determined with greater efficiency than convention systems. A more detailed description of the operation of the WCC 206 is provided below.

Whitening Coefficient Calculator

In various exemplary embodiments, a whitening filter coefficient calculator performs a sub-block Cholesky (LDL) decomposition for a higher order multiple input and multiple output (MIMO) system. In an exemplary embodiment, a 4×4 MIMO matrix decomposition is built upon a simpler computation module of 2×2 dimension. This is achieved by breaking the 4×4 matrix into a 2×2 matrix of 2×2 sub-blocks. The resulting architecture is more efficient for VLSI implementation and more modular than conventional architectures.

Whitening involves the following matrix computations. Assume a noise covariance matrix of dimension N×N, where N is the number of receive antennas in a MIMO system. In an exemplary embodiment, the following covariance matrix (Ruu), lower triangle matrix (L) and diagonal matrix (D) can be defined.

$$R_{uu} = LDL^H$$

$$L = \begin{bmatrix} 1 & & & 0 \\ l_{10} & 1 & & \\ \ldots & & \ldots & \\ l_{N-1,0} & & l_{N-1,N-2} & 1 \end{bmatrix},$$

$$D = \text{diag}(d_{0,0}, \ldots, d_{N-1,N-1})$$

A whitening filter can be designed as $W=(D)^{1/2}L^{-1}$ and can be applied to filter the received signal to generate a whitened signal ($r_{whiten}$) from the product of the whitening filter (W) and the received input values ($r_{in}$) as follows.

$$r_{whiten} = W^H r_{in}$$

Figure 3:
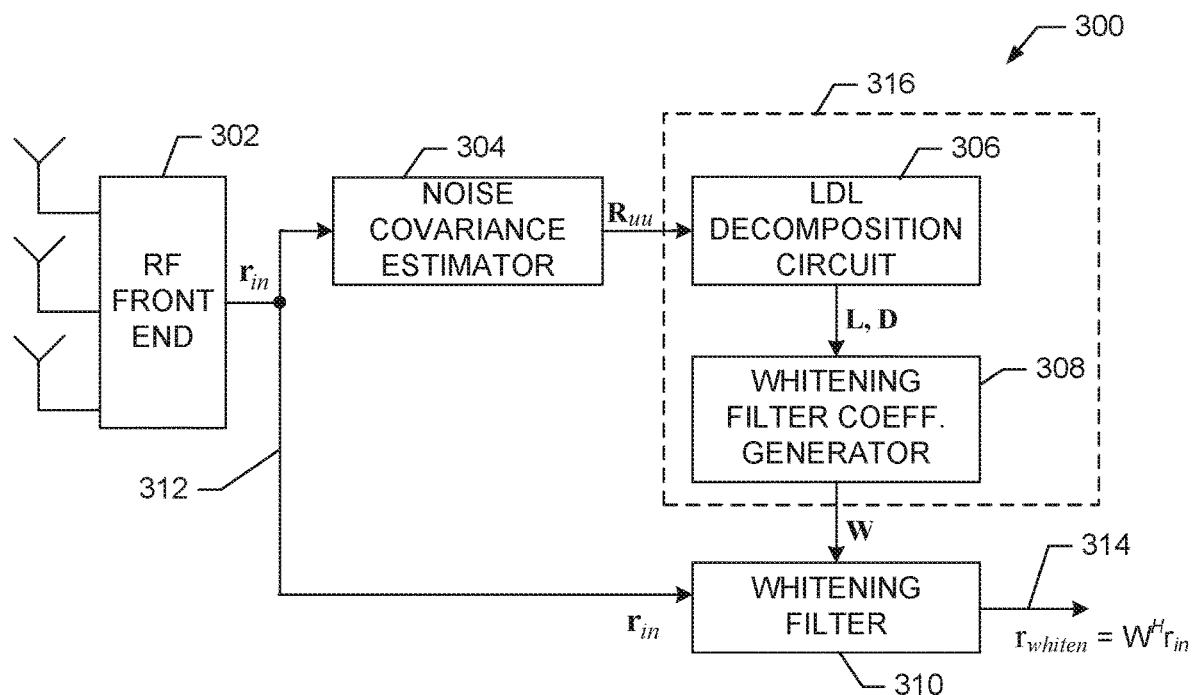
FIG. 3 shows an exemplary framework for use in generating channel whitening coefficients.

FIG. 3 shows an exemplary architecture 300 that comprises a WCC 316 that utilizes an LDL decomposition. The architecture 300 comprises an RF front end 302, noise covariance estimator 304, WCC 316 and whitening filter 310. The WCC 316 comprise LDL decomposition circuit 306 and whitening filter coefficient generator 308. During operation, the received signal ($r_{in}$) is input to the noise covariance estimator 304 and the whitening filter 310. The noise covariance estimator 304 outputs a noise covariance matrix (Ruu) that is input to the LDL decomposition circuit 306. The decomposition circuit 306 generates the lower triangle (L) and diagonal (D) matrices as described above. These matrices are input to the whitening filter coefficient generator 308 that generates the whitening coefficients (W). In an exemplary embodiment, the decomposition is divided into sub-blocks to enhance efficiency and simplify implementation. The whitening filter 310 applies the whitening filter coefficients (W) to the input ($r_{in}$) to generate the whitened output ($r_{whiten}$) 314.

Whitening Coefficient Calculator using a 2×2 LDL Decomposition

In an exemplary embodiment, the case of a 2×2 covariance matrix case is defined as follows.

$$R_{uu} = \begin{bmatrix} r_{00} & r_{01} \\ r_{10} & r_{11} \end{bmatrix}, L = \begin{bmatrix} 1 & \\ l_{10} & 1 \end{bmatrix}, D = \text{diag}(d_{00}, d_{11})$$

where $LDL^H = R_{uu}$. A method to compute whitening matrix coefficients is described as follows. Computations of diagonal ($d_{00}$, $d_{11}$) and lower triangle matrix ($l_{10}$) components can be expressed as illustrated in the following expressions.

$$d_{00} = r_{00}$$

$$d_{11} = r_{11} - \frac{|r_{10}|^2}{r_{00}} = r_{11} - \left(\frac{r_{10\text{-}Re} * r_{10\text{-}Re} + r_{10\text{-}Im} * r_{10\text{-}Im}}{r_{00}}\right)$$

$$l_{10} = \frac{r_{10}}{r_{00}} = \frac{r_{10\text{-}Re} + jr_{10\text{-}Im}}{r_{00}}.$$

while the whitening matrix coefficients can be computed from the four equations as illustrated in the following expressions.

Figure 4:
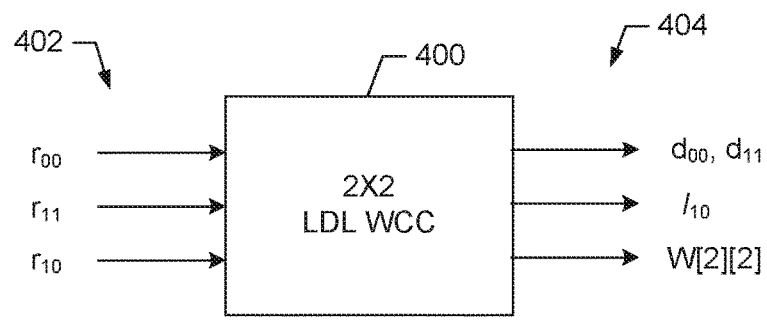
FIG. 4 is a block diagram illustrating an exemplary embodiment of a 2×2 LDL and whitening coefficient calculator.

$W_{00} = 1/\text{sqrt}(d_{00})$ $W_{01} = 0$ $W_{10} = -l_{10}/\text{sqrt}(d_{11})$ $W_{11} = 1/\text{sqrt}(d_{11})$ FIG. 4 is a block diagram illustrating an exemplary embodiment of a 2×2 sub-block LDL WCC 400. For example, the WCC 400 is suitable for use with the WCC 316 shown in FIG. 3 and the WCC 206 shown in FIG. 2. In an exemplary embodiment, the WCC 400 implements the 2×2 LDL decomposition with only independent coefficients. The WCC 400 receives covariance matrix elements 402 and processes these elements to determine D, L, and W matrix values 404. A more detailed description of the WCC 400 is provided below.

Figure 5:
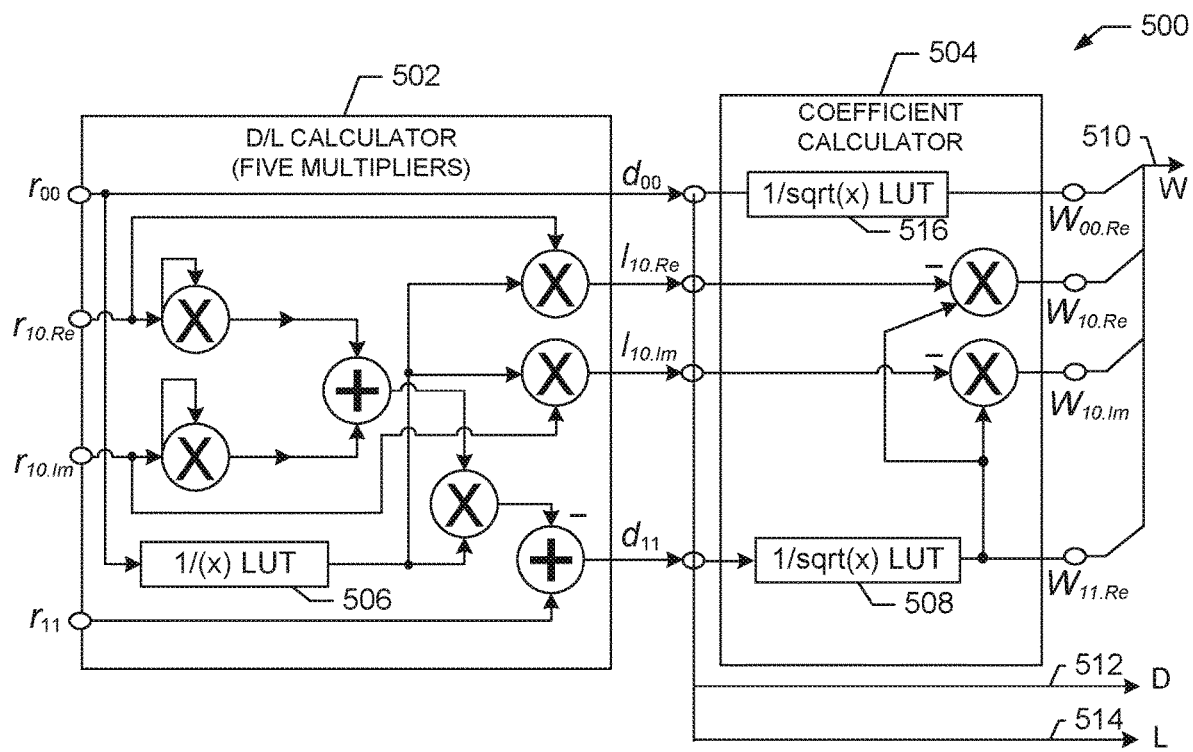
FIG. 5 is a block diagram of a detailed exemplary embodiment of the 2×2 LDL and whitening coefficient calculator shown in FIG. 4.

FIG. 5 is a block diagram of a detailed exemplary embodiment of a 2×2 sub-block LDL WCC 500. For example, the WCC 500 is suitable for use as the WCC 400 shown in FIG. 4. The WCC 500 comprises D/L calculator 502 and coefficient calculator 504. In an exemplary embodiment, the D/L calculator 502 receives matrix elements of a Hermitian covariance 2×2 matrix and computes D and L matrix values. For example, the D/L calculator 502 uses five multipliers, two adders, and a (1/x) look-up table (LUT) 506 to compute the desired D 512 and L 514 matrix values as illustrated in the above expressions.

The outputs from the D/L calculator 502 are input to the coefficient calculator 504 that operates to calculate whitening filter coefficients 510. For example, the coefficient calculator 504 uses two multipliers and two (1/sqrt (x)) (LUTs) 508, 516 to compute the desired whitening coefficients 510 from the outputs of the D/L calculator 502, as illustrated in the above expressions.

Figure 6:
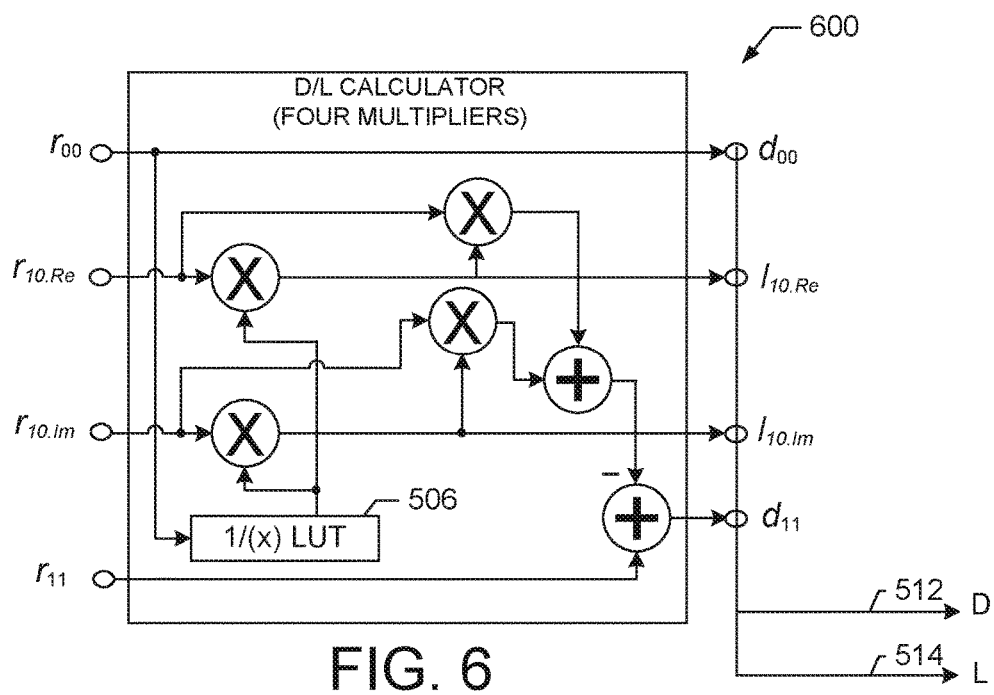
FIG. 6 is a block diagram illustrating an alternative exemplary embodiment of a D/L calculator.

FIG. 6 is a block diagram illustrating an alternative exemplary embodiment of a D/L calculator 600. For example, the D/L calculator 600 is suitable to replace the D/L calculator 502 shown in FIG. 5. In an exemplary embodiment, the D/L calculator 600 comprises four multipliers, two adders, and a (1/x) look-up table (LUT) 506 to compute the desired D 512 and L 514 matrix values to provide a variation with a more efficient data-path and whose computation equations are illustrated in the following expressions.

$$d_{00} = r_{00}$$

$$l_{10} = \frac{r_{10\text{-}Re}}{r_{00}} + j\frac{r_{10\text{-}Im}}{r_{00}}$$

$$d_{11} = r_{11} - \left(\frac{r_{10\text{-}Re}}{r_{00}} * r_{10\text{-}Re} + \frac{r_{10\text{-}Im}}{r_{00}} * r_{10\text{-}Im}\right)$$

Example: Generating Whitening Coefficients from LDL Sub-Block Decomposition

The following is an example illustrating how the WCC performs a 4×4 LDL sub-block decomposition to calculate whitening coefficients in accordance with the exemplary embodiments. A 4×4 covariance matrix ($R_{4\times4}$) is broken down into 2×2 matrices of 2×2 sub-blocks as illustrated in the following expressions.

$$R_{4\times4} = \begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix} = \begin{bmatrix} \begin{bmatrix} r_{00} & r_{01} \\ r_{10} & r_{11} \end{bmatrix} & \begin{bmatrix} r_{20}^* & r_{30}^* \\ r_{21}^* & r_{31}^* \end{bmatrix} \\ \begin{bmatrix} r_{20} & r_{21} \\ r_{30} & r_{31} \end{bmatrix} & \begin{bmatrix} r_{22} & r_{32}^* \\ r_{32} & r_{33} \end{bmatrix} \end{bmatrix}$$

$$R_{00} = \begin{bmatrix} r_{00} & r_{01} \\ r_{10} & r_{11} \end{bmatrix}$$

$$R_{10} = \begin{bmatrix} r_{20} & r_{21} \\ r_{30} & r_{31} \end{bmatrix}$$

$$R_{11} = \begin{bmatrix} r_{22} & r_{32}^* \\ r_{32} & r_{33} \end{bmatrix}$$

Therefore, from the above, $$R_{4\times4} = \begin{bmatrix} R_{00} & (R_{10})^H \\ R_{10} & R_{11} \end{bmatrix}.$$

The LDL decomposition can be broken down into the LDL decomposition of dimension 2×2 as illustrated in the following expressions.

$$R = \begin{bmatrix} R_{00} & R_{10}^H \\ R_{10} & R_{11} \end{bmatrix} = LDL^H$$

$$L = \begin{bmatrix} L_{00} & 0 \\ L_{10} & L_{11} \end{bmatrix}, D = \begin{bmatrix} D_{00} & 0 \\ 0 & D_{11} \end{bmatrix},$$

$$L_{00} = \begin{bmatrix} 1 & 0 \\ l_{00}^{(10)} & 1 \end{bmatrix}, D_{00} = \begin{bmatrix} d_{00}^{(00)} & 0 \\ 0 & d_{00}^{(11)} \end{bmatrix}, D_{11} = \begin{bmatrix} d_{11}^{(00)} & 0 \\ 0 & d_{11}^{(11)} \end{bmatrix}$$

$$L_{11} = \begin{bmatrix} 1 & 0 \\ l_{11}^{(10)} & 1 \end{bmatrix},$$

$$L_{10} = \begin{bmatrix} l_{10}^{(00)} & l_{10}^{(01)} \\ l_{10}^{(10)} & l_{10}^{(11)} \end{bmatrix}.$$

Given the above, the 4×4 LDL decomposition is solved with the following procedure using the 2×2 modules shown in FIGS. 5-6, where the operator [ldl_r2( )] performs the operations of the WCC 500 on the identified input 2×2 matrix, for example, as described with reference to FIG. 5.

$$\begin{bmatrix} R_{00} & R_{10}^H \\ R_{10} & R_{11} \end{bmatrix} = \begin{bmatrix} L_{00}D_{00}L_{00}^H & (L_{10}D_{00}L_{00}^H)^H \\ L_{10}D_{00}L_{00}^H & L_{10}D_{00}L_{10}^H - L_{11}D_{11}L_{11}^H \end{bmatrix},$$

$$\begin{cases} R_{00} = L_{00}D_{00}L_{00}^H \Rightarrow (L_{00}, D_{00}) = \mathrm{ldl\_r2}(R_{00}); \\ L_{10}D_{00}L_{00}^H = R_{10} \Rightarrow L_{10} = R_{10}(D_{00}L_{00}^H)^{-1} \\ L_{11}D_{11}L_{11}^H = R_{11} - L_{10}D_{00}L_{10}^H \Rightarrow (L_{11}, D_{11}) = \mathrm{ldl\_r2}(R_{11} - L_{10}D_{00}L_{10}^H) \end{cases};$$

The whitening filter coefficients can be solved as illustrated in the following expressions.

$$W = D^{-\frac{1}{2}}(L)^{-1} = \begin{bmatrix} W_{00} & 0 \\ W_{10} & W_{11} \end{bmatrix}$$

$$(L)^{-1} = \begin{bmatrix} L_{00}^{-1} & 0 \\ -L_{11}^{-1}L_{10}L_{00}^{-1} & L_{11}^{-1} \end{bmatrix}$$

$$W_{10} = -D_{11}^{-1/2}(L_{11}^{-1}L_{10}L_{00}^{-1}) = -\begin{bmatrix} \dfrac{m_{00}}{\sqrt{d_{11}^{(00)}}} & \dfrac{m_{01}}{\sqrt{d_{11}^{(00)}}} \\ \dfrac{m_{10}}{\sqrt{d_{11}^{(11)}}} & \dfrac{m_{11}}{\sqrt{d_{11}^{(11)}}} \end{bmatrix}$$

where $$M = L_{11}^{-1}L_{10}L_{00}^{-1} = \begin{bmatrix} m_{00} & m_{01} \\ m_{10} & m_{11} \end{bmatrix}$$

$$Q = L_{11}^{-1}L_{10} = \begin{bmatrix} L_{10}(0,0) & L_{10}(0,1) \\ L_{10}(1,0) - L_{11}(1,0) * L_{10}(0,0) & L_{10}(1,1) - L_{11}(1,0) * L_{10}(0,1) \end{bmatrix}$$

$$\begin{cases} m_{00} = L_{10}(0,0) - L_{10}(0,1) * L_{00}(1,0) \\ m_{01} = L_{10}(0,1) \\ m_{10} = q_{10} - L_{00}(1,0)q_{11} \\ m_{11} = q_{11} \end{cases}$$

Figure 7:
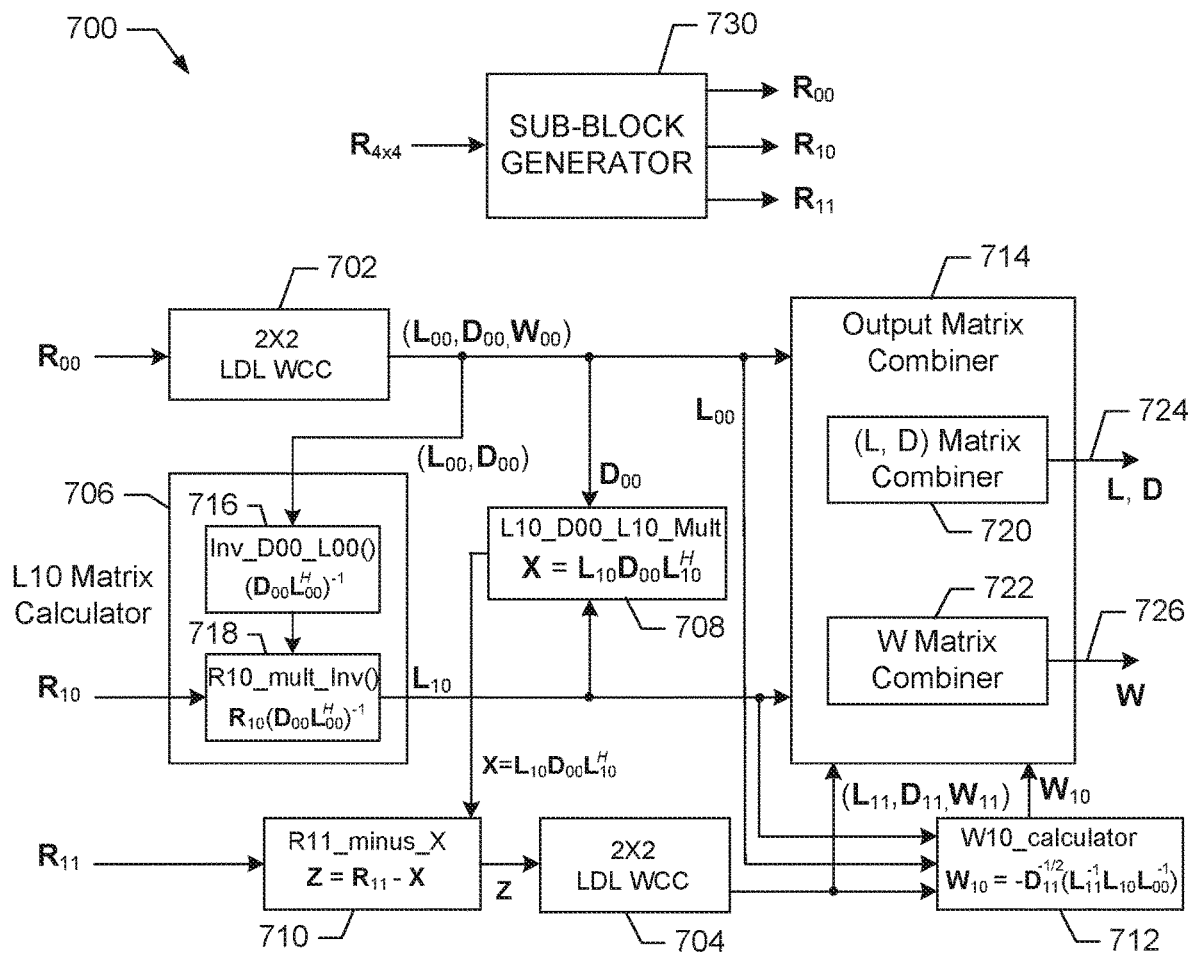
FIG. 7 is a block diagram illustrating an exemplary embodiment of a 4×4 matrix LDL decomposition and whitening matrix generator based on a 2×2 sub-block decomposition in accordance with exemplary embodiments.

FIG. 7 is a block diagram illustrating an exemplary embodiment of a 4×4 matrix LDL decomposition and whitening coefficient calculator 700 based on a 2×2 sub-block decomposition in accordance with exemplary embodiments. The calculator 700 provides computation for both the LDL decomposition and the whitening filter coefficient matrix.

The calculator 700 utilizes a 2×2 LDL WCC 702 (e.g., shown in FIGS. 4-6) as a simple base module for the 2×2 matrix decomposition and another 2×2 LDL WCC 704 when the matrix dimension grows to 4×4.

In an exemplary embodiment, a sub-block generator 730 generates 2×2 sub-blocks from an input covariance matrix. A first 2×2 LDL WCC 702 generates ($L_{00}$, $D_{00}$, and $W_{00}$) from the covariance matrix sub-block ($R_{00}$). A second 2×2 LDL WCC 704 generates ($L_{11}$, $D_{11}$, and $W_{11}$) from the covariance matrix sub-block ($R_{11}$) minus [Z=$R_{11}$-X]. For example, the generators 702 and 704 perform the expressions shown above.

The calculator 700 also comprises L10 matrix calculator 706, matrix multiplier 708, and matrix subtractor 710. The L10 matrix calculator 706 includes inversion calculator 716 and matrix multiplier 718.

During operation, the 2×2 LDL WCC 702 receives the $R_{00}$ matrix and calculates the matrices $L_{00}$, $D_{00}$, and $W_{00}$ as described in the above expressions. The inversion function 716 of the L10 matrix calculator 706 receives the $L_{00}$ and $D_{00}$ matrices and calculates the matrix $(D_{00}L_{00}^H)^{-1}$ that is input to a matrix multiplier 718. The multiplier 718 also receives the matrix $R_{10}$ and calculates the matrix $L_{10}$ from $R_{10}(D_{00}L_{00}^H)^{-1}$.

The matrix multiplier 708 receives the matrices $D_{00}$ and $L_{10}$ and calculates a matrix X from $L_{00}D_{00}L_{10}^H$. The matrix subtractor 710 subtracts the matrix X from the matrix $R_{11}$ to generate a matrix (Z) that is input to the 2×2 LDL WCC 704.

The W10 calculator 712 receives the $L_{10}$ matrix, the $L_{00}$ matrix, and the $L_{11}$ and $D_{11}$ matrices output from the 2×2 LDL WCC 704. The W10 calculator 712 uses the received matrices to calculate $W_{10}$ by calculating the expression $-D_1^{1/2}(L_{11}^{-1}L_{10}L_{00}^{-1})$.

An output matrix combiner block 714 is shown but is optional. For example, it may be desirable output individual matrix elements. However, in an embodiment, the block 714 receives the various calculated L, D, and W matrices and consolidates the sub-block results into large 4×4 output matrices. For example, 4×4 matrices for L and D 724 are formed by combiner 720 and a 4×4 matrix for W 726 (whitening coefficients) is formed by combiner 722. These matrices can be utilized by other functions to perform signal whitening or pilot whitening as illustrated in FIG. 2.

Compared with a conventional and sequential decomposition architecture that is iterative on each increasing dimension, the novel sub-block architecture described above provides significant improvements and advantages, which include the following.

1. More scalable for the increasing dimension of 2×2 and 4×4 matrices.
2. Reusable modules and data paths.
3. More parallelism and efficient utilization of the data-path and logic are better suited for high throughput VLSI implementations.

Accordingly, the various exemplary embodiments of the sub-block decomposition architecture generate whitening coefficients and can be used in various receiver processing flows, including but not limited to an LTE/NR PUCCH receiver or a PUSCH receiver. One example of the use of the disclosed sub-block architecture is shown in the PUCCH F3 receiver, as illustrated in FIG. 2.

Figure 8:
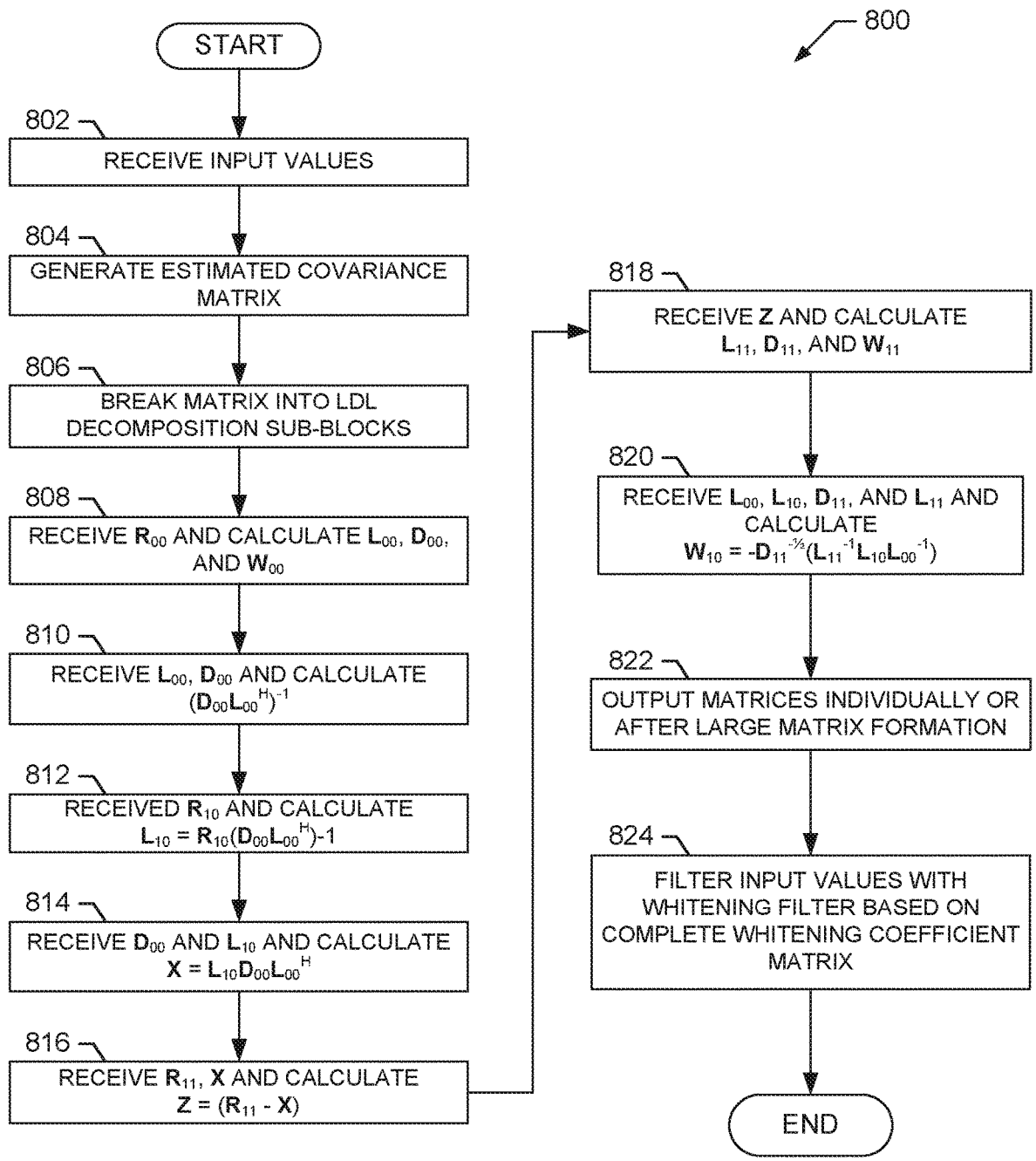
FIG. 8 shows an exemplary embodiment of a method for determine whitening coefficients using a sub-block Cholesky architecture.

FIG. 8 shows an exemplary embodiment of a method 800 for calculating whitening coefficients using embodiments of the sub-block Cholesky decomposition as described herein. For example, the method 800 is suitable for use with the calculator 700 shown in FIG. 7.

At block 802, input values are received. For example, in an embodiment, the input values are derived from received MIMO signals.

At block 804, an estimated covariance matrix is generated from the input values. For example, a 4×4 estimated covariance matrix is generated as illustrated in the expressions above.

At block 806, as part of an LDL decomposition, the covariance matrix is broken into sub-blocks. For example, the covariance matrix is broken into 2×2 sub-blocks by sub-block generator 730 shown in FIG. 7 and as illustrated in the expressions above.

At block 808, matrices for $L_{00}$, $D_{00}$, and $W_{00}$ are calculated from covariance sub-block $R_{00}$. In an exemplary embodiment, the 2×2 LDL 702 performs this calculation. For example, the 2×2 LDL WCC 500 shown in FIG. 5 is suitable for use to perform this calculation.

At block 810, the matrices for $L_{00}$ and $D_{00}$ are used to calculate a matrix $(D_{00}L_{00}^H)^{-1}$. In an exemplary embodiment, the inversion function 716 performs this calculation.

At block 812, the matrix for $R_{10}$ is used to calculate $L_{10}$. In an exemplary embodiment, the matrix $L_{10}$ is calculated from $R_{10}(D_{00}L_{00}{}^H)^{-1}$. In an exemplary embodiment, the multiplier 718 performs this calculation.

At block 814, the matrices for $D_{00}$ and $L_{10}$ are used to calculate a matrix X. For example, the matrix X is calculated from $L_{10}D_{00}L_{00}{}^H$. In an exemplary embodiment, the multiplier 708 performs this calculation.

At block 816, the matrices for $R_{11}$ and X are received and used to calculate a difference matrix (Z=$R_{11}$−X). In an exemplary embodiment, the subtractor 710 performs this calculation.

At block 818, the matrices $L_{11}$, $D_{11}$, and $W_{11}$ are calculated from the difference matrix (Z). In an exemplary embodiment, the 2×2 LDL WCC 704 receives the difference matrix (Z) and calculates the matrices $L_{11}$, $D_{11}$, and $W_{11}$.

At block 820, the matrices $L_{00}$, $L_{10}$, $D_{11}$, and $L_{11}$ are received and used to calculate $W_{10}$. For example, $W_{10}$ is calculated as $-D_{11}{}^{1/2}(L_{11}{}^{-1}L_{10}L_{00}{}^{-1})$. In an exemplary embodiment, the W10 calculator 712 performs this calculation.

At block 822, the calculated D, L and whitening coefficient matrix W are output either by individual components or by a combined large matrix. For example, the matrix combiner 714 performs matrix formation to output large matrices.

At block 824, the input values are filtered using a whitening filter that is generated using the calculated whitening coefficients.

Thus, the method 800 operates to utilize a sub-block Cholesky decomposition architecture to determine whitening coefficients. It should be noted that the operations of the method 800 may be added to, subtracted from, deleted, changes, rearranged or otherwise modified within the scope of the embodiments.

Figure 9:
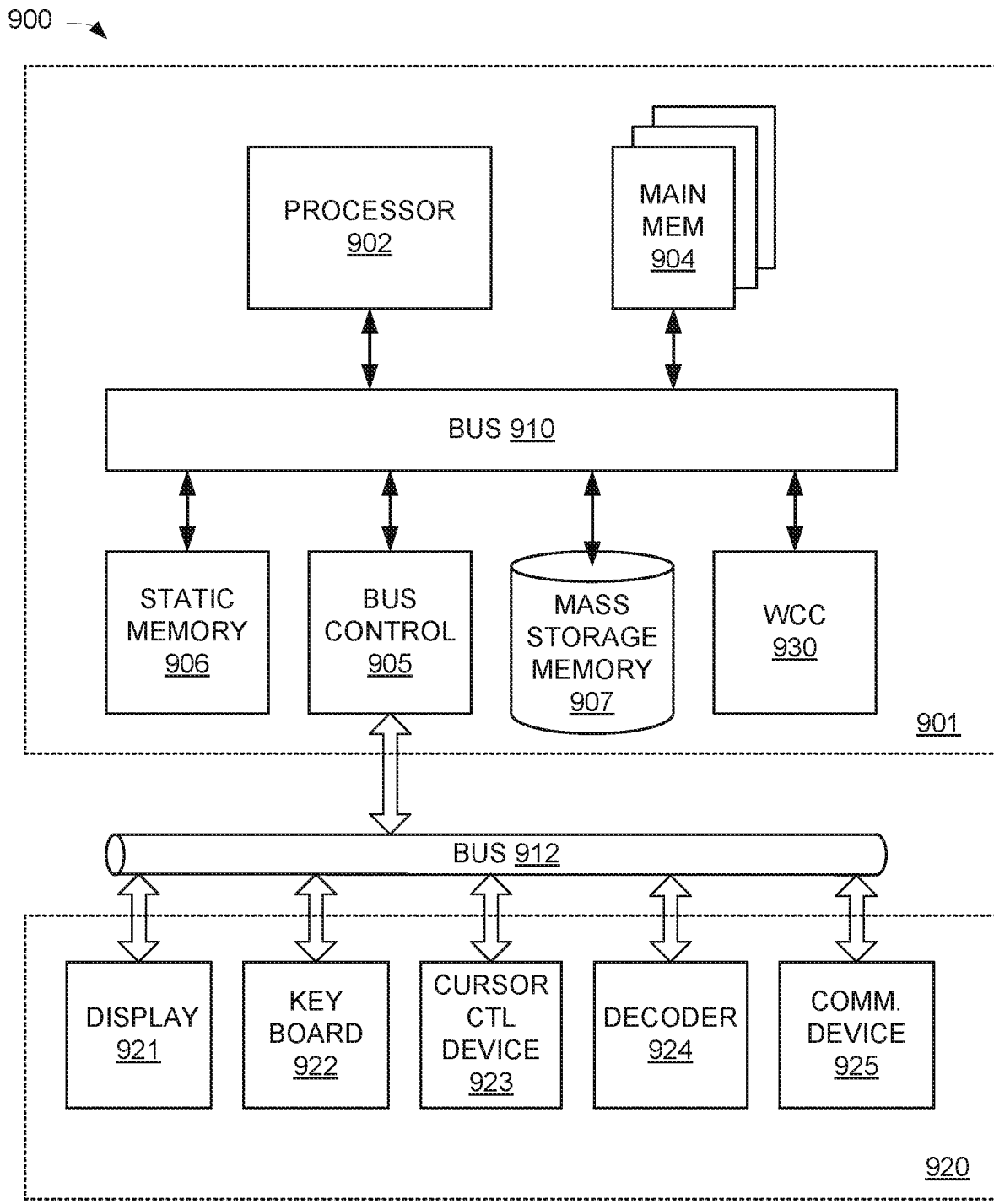
FIG. 9 illustrates an exemplary digital computing system with various features for network communication that include a sub-block decomposition and whitening coefficient calculator and associated methods.

FIG. 9 illustrates an exemplary digital computing system 900 with various features for network communication that include a sub-block decomposition and whitening coefficient calculator and associated methods as described above. It will be apparent to those of ordinary skill in the art that other alternative computer system architectures may also be employed.

Computer system 900 includes a processing unit 901, an interface bus 912, and an input/output ("IO") unit 920. Processing unit 901 includes a processor 902, main memory 904, system bus 910, static memory device 906, bus control unit 905, and mass storage memory 907. Bus 910 is used to transmit information between various components and processor 902 for data processing. Processor 902 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 904, which may include multiple levels of cache memories, stores frequently used data and instructions. Main memory 904 may be RAM (random access memory), MRAM (magnetic RAM), or flash memory. Static memory 906 may be a ROM (read-only memory), which is coupled to bus 911, for storing static information and/or instructions. Bus control unit 905 is coupled to buses 910-912 and controls which component, such as main memory 904 or processor 902, can use the bus. Mass storage memory 907 may be a magnetic disk, solid-state drive ("SSD"), optical disk, hard disk drive, floppy disk, CD-ROM, and/or flash memories for storing large amounts of data.

I/O unit 920, in one example, includes a display 921, keyboard 922, cursor control device 923, decoder 924, and communication device 925. Display device 921 may be a liquid crystal device, flat panel monitor, cathode ray tube ("CRT"), touch-screen display, or other suitable display device. Display 921 projects or displays graphical images or windows. Keyboard 922 can be a conventional alphanumeric input device for communicating information between computer system 900 and computer operator(s). Another type of user input device is cursor control device 923, such as a mouse, touch mouse, trackball, or other type of cursor for communicating information between system 900 and user(s).

Communication device 925 is coupled to bus 912 for accessing information from remote computers or servers through wide-area network. Communication device 925 may include a modem, a router, or a network interface device, or other similar devices that facilitate communication between computer 900 and the network. In one aspect, communication device 925 is configured to perform wireless functions.

In one embodiment, WCC 930 is coupled to bus 910 and is configured to provide sub-block Cholesky decomposition to generate whitening coefficients with which to filter received data to aid in detection. In various exemplary embodiments, the WCC 930 comprises hardware, firmware, or a combination of hardware, and firmware. For example, in one embodiment, the WCC 930 comprises the whitening coefficient calculator 700 shown in FIG. 7. In an exemplary embodiment, the WCC 930 and communication device 925 perform data reception and whitening in accordance with one embodiment of the present invention.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method operable by a transceiver at a base station coupling to a communications network for parallel processing sub-block matrices ($R_{00}$, $R_{10}$, and $R_{11}$) of a covariance matrix (R) to determine a whitening coefficient matrix (W), the transceiver configured to include a whitening coefficient calculator (WCC), the method comprising:
    calculating a first whitening matrix $W_{00}$, lower triangle matrix $L_{00}$, and diagonal matrix $D_{00}$ from the sub-block matrix $R_{00}$;
    calculating a lower triangle matrix $L_{10}$ from the sub-block matrix $R_{10}$ and the matrices $L_{00}$ and $D_{00}$;
    calculating a matrix X from the matrices $D_{00}$ and $L_{10}$;
    calculating a matrix Z from the matrix X and the sub-block matrix $R_{11}$;
    calculating a third whitening matrix $W_{11}$, lower triangle matrix $L_{11}$, and a diagonal matrix $D_{11}$ from the matrix Z; and
    calculating a second whitening matrix $W_{10}$ from the matrices $L_{00}$, $L_{10}$, $L_{11}$, and $D_{11}$.

2. The method of claim 1, wherein each of the operations of calculating the first whitening matrix and calculating the second whitening matrix comprise receiving a Hermitian input matrix and calculating elements associated with selected diagonal, lower triangle, and whitening matrices.

3. The method of claim 1, wherein each of the operations of calculating the first whitening matrix and calculating the second whitening matrix comprises calculating diagonal ($d_{00}$, $d_{11}$) of selected diagonal matrix and a triangle matrix ($l_{10}$) of a select lower triangle matrix according to:

$$d_{00} = r_{00}$$

$$d_{11} = r_{11} - \frac{|r_{10}|^2}{r_{00}} = r_{11} - \left(\frac{r_{10 \cdot Re} * r_{10 \cdot Re} + r_{10 \cdot Im} * r_{10 \cdot Im}}{r_{00}}\right)$$

$$l_{10} = \frac{r_{10}}{r_{00}} = \frac{r_{10 \cdot Re} + jr_{10 \cdot Im}}{r_{00}}$$

4. The method of claim 1, wherein each of the operations of calculating the first whitening matrix and calculating the second whitening matrix comprises calculating diagonal ($d_{00}$, $d_{11}$) of selected diagonal matrix and a triangle matrix ($l_{10}$) of a select lower triangle matrix according to:

$$d_{00} = r_{00}$$

$$l_{10} = \frac{r_{10 \cdot Re}}{r_{00}} + j\frac{r_{10 \cdot Im}}{r_{00}}$$

$$d_{11} = r_{11} - \left(\frac{r_{10 \cdot Re}}{r_{00}} * r_{10 \cdot Re} + \frac{r_{10 \cdot Im}}{r_{00}} * r_{10 \cdot Im}\right)$$

5. The method of claim 1, wherein each of the means for calculating the first whitening matrix and the means for calculating the second whitening matrix comprises calculating ($W_{00}$, $W_{10}$, $W_{11}$) of a selected whitening matrix according to:

$W_{00}$=1/sqrt($d_{00}$)

$W_{01}$=0

$W_{10}$=$-l_{10}$/sqrt($d_{11}$)

$W_{11}$=1/sqrt($d_{11}$).

6. An apparatus that parallel processes sub-block matrices ($R_{00}$, $R_{10}$, and $R_{11}$) of a covariance matrix (R) to determine a whitening coefficient matrix (W), the apparatus comprising:
  a first lower triangle matrix and diagonal matrix (LDL, coefficient calculator that calculates a first whitening matrix $W_{00}$, lower triangle matrix $L_{00}$, and diagonal matrix $D_{00}$ from the sub-block matrix $R_{00}$;
  a first matrix calculator that calculates a lower triangle matrix $L_{10}$ from the sub-block matrix $R_{10}$ and the matrices $L_{00}$ and $D_{00}$;
  a second matrix calculator that calculates a matrix X from the matrices $D_{00}$ and $L_{10}$;
  a matrix subtractor that calculates a matrix Z from the matrix X and the sub-block matrix $R_{11}$;
  a second LDL coefficient calculator that calculates a third whitening matrix $W_{11}$, lower triangle matrix $L_{11}$, and a diagonal matrix $D_{11}$ from the matrix Z; and
  a third matrix calculator that calculates a second whitening matrix $W_{10}$ from the matrices $L_{00}$, $L_{10}$, $L_{11}$, and $D_{11}$.

7. The apparatus of claim 6, further comprising an output combiner that combines the first, second, and third whitening matrices to form a whitening coefficient matrix that is output.

8. The apparatus of claim 6, wherein the first matrix calculator comprises an inverter and a multiplier, and wherein the inverter received the matrices L00 and D00 and determines an output matrix from $(D_{00} L_{00}^H)^{-1}$ and the multiplier multiples the output matrix with the sub-block matrix $R_{10}$ to calculate $L_{10}$.

9. The apparatus of claim 6, wherein the second matrix calculator calculates the matrix X from $(L_{10}D_{00}L_{10}^H)$.

10. The apparatus of claim 6, wherein the matrix subtractor subtracts the matrix X from the sub-block matrix $R_{11}$ to determine the matrix Z.

11. The apparatus of claim 6, wherein the third matrix calculator calculates $W_{10}$ from $-D_{11}^{-1/2}(L_{11}^{-1}L_{10}L_{00}^{-1})$.

12. The apparatus of claim 6, wherein each of the first and second LDL coefficient calculators is configured to receive a Hermitian input matrix and calculate elements associated with selected diagonal, lower triangle, and whitening matrices.

13. The apparatus of claim 12, wherein each of the LDL coefficient calculators comprises a calculator that includes five multipliers, two adders and one function that calculate diagonal ($d_{00}$, $d_{11}$) of the selected diagonal matrix and a triangle matrix ($i_{10 \cdot RE}$, $i_{10 \cdot IM}$) of the select lower triangle matrix according to:

$$d_{00} = r_{00}$$

$$d_{11} = r_{11} - \frac{|r_{10}|^2}{r_{00}} = r_{11} - \left(\frac{r_{10 \cdot Re} * r_{10 \cdot Re} + r_{10 \cdot Im} * r_{10 \cdot Im}}{r_{00}}\right)$$

$$l_{10} = \frac{r_{10}}{r_{00}} = \frac{r_{10 \cdot Re} + jr_{10 \cdot Im}}{r_{00}}$$

14. The apparatus of claim 12, wherein each of the LDL coefficient calculators comprises a calculator that includes four multipliers, two adders and one function that calculate diagonal ($d_{00}$, $d_{11}$) of the selected diagonal matrix and a triangle matrix ($i_{10 \cdot RE}$, $i_{10 \cdot IM}$) of the select lower triangle matrix according to:

$$d_{00} = r_{00}$$

$$l_{10} = \frac{r_{10 \cdot Re}}{r_{00}} + j\frac{r_{10 \cdot Im}}{r_{00}}$$

$$d_{11} = r_{11} - \left(\frac{r_{10 \cdot Re}}{r_{00}} * r_{10 \cdot Re} + \frac{r_{10 \cdot Im}}{r_{00}} * r_{10 \cdot Im}\right)$$

15. The apparatus of claim 12, wherein each of the LDL coefficient calculators comprises a coefficient calculator that includes two multipliers and two functions that calculate ($W_{00 \cdot Re}$, $W_{10 \cdot Re}$, $W_{10 \cdot im}$, $W_{11 \cdot Re}$) of selected whitening matrix according to:

$W_{00}$=1/sqrt($d_{00}$)

$W_{01}$=0

$W_{10}$=$-l_{10}$/sqrt($d_{11}$)

$W_{11}$=1/sqrt($d_{11}$)

where ($d_{00}$, $d_{11}$) is diagonal matrix and ($l_{10}$) is a triangle matrix.

16. An apparatus that parallel processes sub-block matrices ($R_{00}$, $R_{10}$, and $R_{11}$) of a covariance matrix (R) to determine a whitening coefficient matrix (W), the apparatus comprising:
  means for calculating a first whitening matrix $W_{00}$, lower triangle matrix $L_{00}$, and diagonal matrix $D_{00}$ from the sub-block matrix $R_{00}$;

means for calculating a lower triangle matrix $L_{10}$ from the sub-block matrix $R_{10}$ and the matrices $L_{00}$ and $D_{00}$;

means for calculating a matrix X from the matrices $D_{00}$ and $L_{10}$;

means for calculating a matrix Z from the matrix X and the sub-block matrix $R_{11}$;

means for calculating a third whitening matrix $W_{11}$, lower triangle matrix $L_{11}$, and a diagonal matrix $D_{11}$ from the matrix Z; and means for calculating a second whitening matrix $W_{10}$ from the matrices $L_{00}$, $L_{10}$, $L_{11}$, and $D_{11}$.

17. The apparatus of claim 16, wherein each of the means for calculating the first whitening matrix and the means for calculating the second whitening matrix is configured to receive a Hermitian input matrix and calculate elements associated with selected diagonal, lower triangle, and whitening matrices.

18. The apparatus of claim 16, wherein each of the means for calculating the first whitening matrix and the means for calculating the second whitening matrix comprises a that includes five multipliers, two adders and one function that calculate diagonal ($d_{00}$, $d_{11}$) of the selected diagonal matrix and a triangle matrix ($i_{10.RE}$, $i_{10.IM}$) of the select lower triangle matrix according to:

$$d_{00} = r_{00}$$

$$d_{11} = r_{11} - \frac{|r_{10}|^2}{r_{00}} = r_{11} - \left(\frac{r_{10\cdot Re} * r_{10\cdot Re} + r_{10\cdot Im} * r_{10\cdot Im}}{r_{00}}\right)$$

$$l_{10} = \frac{r_{10}}{r_{00}} = \frac{r_{10\cdot Re} + j r_{10\cdot Im}}{r_{00}}$$

19. The apparatus of claim 16, wherein each of the means for calculating the first whitening matrix and the means for calculating the second whitening matrix comprises a calculator that includes four multipliers, two adders and one function that calculate diagonal ($d_{00}$, $d_{11}$) of the selected diagonal matrix and a triangle matrix ($i_{10.RE}$, $i_{10.IM}$) of the select lower triangle matrix according to:

$$d_{00} = r_{00}$$

$$l_{10} = \frac{r_{10\cdot Re}}{r_{00}} + j\frac{r_{10\cdot Im}}{r_{00}}$$

$$d_{11} = r_{11} - \left(\frac{r_{10\cdot Re}}{r_{00}} * r_{10\cdot Re} + \frac{r_{10\cdot Im}}{r_{00}} * r_{10\cdot Im}\right)$$

20. The apparatus of claim 16, wherein each of the means for calculating the first whitening matrix and the means for calculating the second whitening matrix comprises a coefficient calculator that includes two multipliers and two functions that calculate ($W_{00}$, $W_{10}$, $W_{11}$) of selected whitening matrix according to:

$W_{00}=1/\text{sqrt}(d_{00})$ $W_{01}=0$ $W_{10}=-l_{10}/\text{sqrt}(d_{11})$ $W_{11}=1/\text{sqrt}(d_{11})$ where ($d_{00}$, $d_{11}$) is diagonal matrix and ($l_{10}$) is a triangle matrix.

\* \* \* \* \*